(12) United States Patent
Barnett (10) Patent No.: US 12,188,376 B2
(45) Date of Patent: Jan. 7, 2025

(54) COMPOSITE GUIDE VANE WITH INSERT

(71) Applicant: PRATT & WHITNEY CANADA CORP., Longueuil (CA)

(72) Inventor: Barry Barnett, Unionville (CA)

(73) Assignee: PRATT & WHITNEY CANADA CORP., Longueuil (CA)

(*) Notice: Subject to any disclaimer, the term of this patent is extended or adjusted under 35 U.S.C. 154(b) by 0 days.

(21) Appl. No.: 18/128,112

(22) Filed: Mar. 29, 2023

(65) Prior Publication Data
US 2024/0328322 A1    Oct. 3, 2024

(51) Int. Cl.
| | | |
|---|---|---|
| *F01D 9/02* | (2006.01) | |
| *B32B 3/26* | (2006.01) | |
| *B32B 5/02* | (2006.01) | |
| *B32B 5/26* | (2006.01) | |
| *B32B 38/18* | (2006.01) | |

(52) U.S. Cl.
CPC ............... *F01D 9/02* (2013.01); *B32B 3/263* (2013.01); *B32B 5/02* (2013.01); *B32B 5/26* (2013.01); *B32B 38/1808* (2013.01); *B32B 2260/023* (2013.01); *B32B 2260/046* (2013.01); *B32B 2305/076* (2013.01); *B32B 2603/00* (2013.01); *F05D 2220/32* (2013.01); *F05D 2230/23* (2013.01); *F05D 2240/12* (2013.01); *F05D 2300/603* (2013.01)

(58) Field of Classification Search
CPC .................................................. B32B 2603/00
See application file for complete search history.

(56) References Cited

U.S. PATENT DOCUMENTS

| | | | |
|---|---|---|---|
| 4,594,761 A | 6/1986 | Murphy et al. | |
| 5,074,752 A | 12/1991 | Murphy et al. | |
| 9,103,214 B2 * | 8/2015 | McCaffrey | F01D 9/041 |

(Continued)

FOREIGN PATENT DOCUMENTS

| | | |
|---|---|---|
| EP | 1481747 A2 | 12/2004 |
| EP | 2469031 B1 | 11/2016 |

(Continued)

OTHER PUBLICATIONS

European Patent Office, Communication re. extended European search report for European patent application No. 24166898.7, Sep. 23, 2024.

*Primary Examiner* — Courtney D Heinle
*Assistant Examiner* — Danielle M. Christensen
(74) *Attorney, Agent, or Firm* — Norton Rose Fulbright Canada LLP (57) ABSTRACT

Composite guide vanes for gas turbine engines are described together with methods of manufacturing such composite guide vanes. A composite guide vane comprises a body having a longitudinal axis and including a composite laminate made of an assembly of layers of a first fibrous composite material. The composite laminate defines a mid portion of the body for interacting with a fluid and an end portion of the body disposed axially of the mid portion of the body. A composite insert is disposed inside the composite laminate and made of a second fibrous composite material. The composite insert extends axially from the end portion of the body to a second location in the mid portion of the body. A head or foot of the composite guide vane envelops the end portion of the body.

17 Claims, 10 Drawing Sheets

(56) References Cited

U.S. PATENT DOCUMENTS

| | | | |
|---|---|---|---|
| 10,584,603 B2 | 3/2020 | Guilbert | |
| 10,858,944 B2 * | 12/2020 | Gill | B29C 70/46 |
| 10,941,665 B2 * | 3/2021 | Weaver | F01D 5/3053 |
| 11,111,798 B2 | 9/2021 | Lanfant | |
| 11,352,891 B2 | 6/2022 | Barnett | |
| 2012/0301315 A1 | 11/2012 | Alvanos | |
| 2016/0047257 A1 * | 2/2016 | Radomski | F01D 5/282 |
| | | | 415/208.1 |
| 2020/0024958 A1 | 1/2020 | Gill | |
| 2022/0259979 A1 | 8/2022 | Barnett | |

FOREIGN PATENT DOCUMENTS

| | | | |
|---|---|---|---|
| EP | 2469045 B1 | 3/2021 | |
| WO | 2015017001 A2 | 2/2015 | |
| WO | 2018158544 A1 | 9/2018 | |
| WO | 2021209709 A1 | 10/2021 | |

* cited by examiner

COMPOSITE GUIDE VANE WITH INSERT

TECHNICAL FIELD

The disclosure relates generally to gas turbine engines, and more particularly to composite guide vanes.

BACKGROUND

Guide vanes are typically arranged in rows and serve to guide a gas stream passing through a gas turbine engine toward a desired orientation. Guide vanes are generally made of metal, but it is becoming desirable to make them out of composite materials to reduce their weight. Methods of fabricating guide vanes out of composite materials can be complex, require expensive tooling and be time consuming. Improvement is desirable.

SUMMARY

In one aspect, the disclosure describes a composite guide vane for a gas turbine engine. The composite guide vane comprises:
a body having a longitudinal axis, the body including:
a composite laminate made of an assembly of layers of a first fibrous composite material, the composite laminate defining a mid portion of the body for interacting with a fluid and an end portion of the body disposed axially of the mid portion of the body; and
a composite insert disposed inside the composite laminate and made of a second fibrous composite material, the composite insert extending axially from the end portion of the body into the mid portion of the body and terminating in the mid portion of the body; and
a head or foot overmolded onto the end portion of the body.

In another aspect, the disclosure describes a gas turbine engine comprising:
an air inlet for receiving air;
a compressor for pressurizing the air;
a combustor in which the air is received from the compressor, mixed with fuel and ignited for generating a stream of combustion gas;
a turbine for extracting energy from the combustion gas; and
a composite guide vane for interacting with the air, the composite guide vane including:
a body having a longitudinal axis, the body including:
a composite laminate made of an assembly of layers of a fibrous composite material, the composite laminate defining a mid portion of the body for interacting with a fluid and an end portion of the body disposed axially of the mid portion; and
an insert sandwiched between two of the layers of the composite laminate and fused with the composite laminate, the insert extending axially from the end portion into the mid portion and terminating in the mid portion of the body; and
a head or foot enveloping the end portion of the body.

In a further aspect, the disclosure describes a method of manufacturing a composite guide vane of a gas turbine engine. The method comprises:
receiving a layup including fiber-reinforced composite sheets and a composite insert disposed between the fiber-reinforced composite sheets;
consolidating the layup into a unified body using heat and pressure, the body having a longitudinal axis and including a mid portion for interacting with a fluid and an end portion disposed axially of the mid portion, the composite insert extending axially from a first location in the end portion to a second location in the mid portion; and
overmolding a head or foot of the composite guide vane onto the end portion of the body.

Further details of these and other aspects of the subject matter of this application will be apparent from the detailed description included below and the drawings.

DESCRIPTION OF THE DRAWINGS

Reference is now made to the accompanying drawings, in which.

DETAILED DESCRIPTION

The following disclosure describes constructions of composite guide vanes for gas turbine engines and methods of manufacturing such composite guide vanes. In some embodiments, the methods described herein may facilitate the manufacturing of composite guide vanes having improved durability. For example, in some embodiments, the composite guide vanes disclosed herein may include an insert integrated in a body of the composite guide vane to promote reduced stresses in the composite guide vane due to aerodynamic pressure loading and foreign object impact during use. In some embodiments, the composite guide vanes disclosed herein may also promote mechanical retention of the body with a head and/or foot of the composite guide vane.

The term "substantially" as used herein may be applied to modify any quantitative representation which could permissibly vary without resulting in a change in the basic function to which it is related. For example, component dimensions that are referred herein as "substantially the same" may permissibly differ by amounts tied to dimensional tolerances associated with the manufacturing processes used.

Aspects of various embodiments are described through reference to the drawings.

Figure 1:
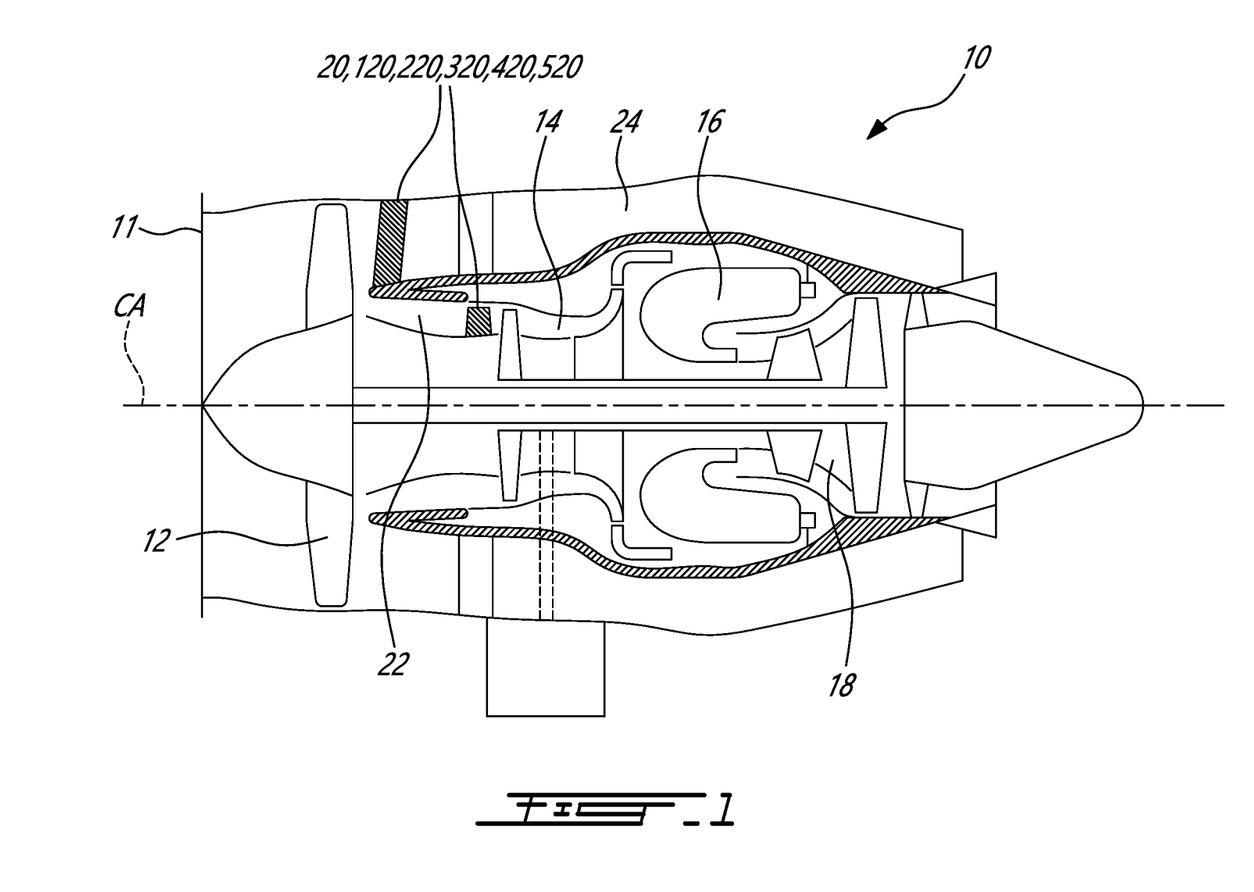
FIG. 1 shows a schematic axial cross-section view of a turbofan gas turbine engine including one or more composite guide vanes as described herein.

FIG. 1 illustrates gas turbine engine 10 (referred hereinafter as "engine 10") of a type preferably provided for use in subsonic flight, generally comprising in serial flow communication, air inlet 11 for receiving ambient air, fan 12 through which the ambient air is propelled, a multistage compressor 14 for pressurizing the air, a combustor 16 in which the pressurized air is mixed with fuel and ignited to generate an annular stream of hot combustion gas(es), and turbine section 18 including one or more turbines for extracting energy from the combustion gas(es). Engine 10 may be of a type suitable for use in aircraft applications. For example, engine 10 may be a turbofan (as illustrated), a turboshaft or a turboprop type of aircraft engine.

Engine 10 may include one or more composite guide vanes 120, 220, 320, 420, 520 (also referred generally herein in the singular as "vane 20") made using one or more methods described herein. Vane 20 may be of a type known as a "guide vane" or "stator vane" that is used to direct fluid flow toward a desired direction so as to be received onto downstream rotor blades at a desired orientation (angle) for example. In some embodiments, vane 20 may be suitable for installation in core gas path 22 of engine 10. Compressor 14, combustor 16 and one or more turbines of turbine section 18 may be disposed serially along core gas path 22. In some embodiments, vane 20 may be a (e.g., variable orientation) inlet guide vane or other type of vane disposed upstream of compressor 14. In some embodiments, vane 20 may be disposed between two rotor stages of compressor 14. Alternatively, vane 20 may be a bypass stator vane disposed in a bypass duct 24 of engine 10. In various embodiments, vane 20 may have a fixed orientation within engine 10 or may have a controllably variable orientation within engine 10.

Engine 10 may have central axis CA corresponding to an axis of rotation of one or more spools of engine 10. Bypass duct 24 may extend generally annularly about central axis CA. Core gas path 22 may also extend generally annularly about central axis CA. Bypass duct 24 may be disposed radially outwardly of core gas path 22 relative to central axis CA. In some embodiments of engine 10, a plurality of vanes 20 may be angularly distributed about central axis CA in bypass duct 24 and/or in core gas path 22.

Figure 2:
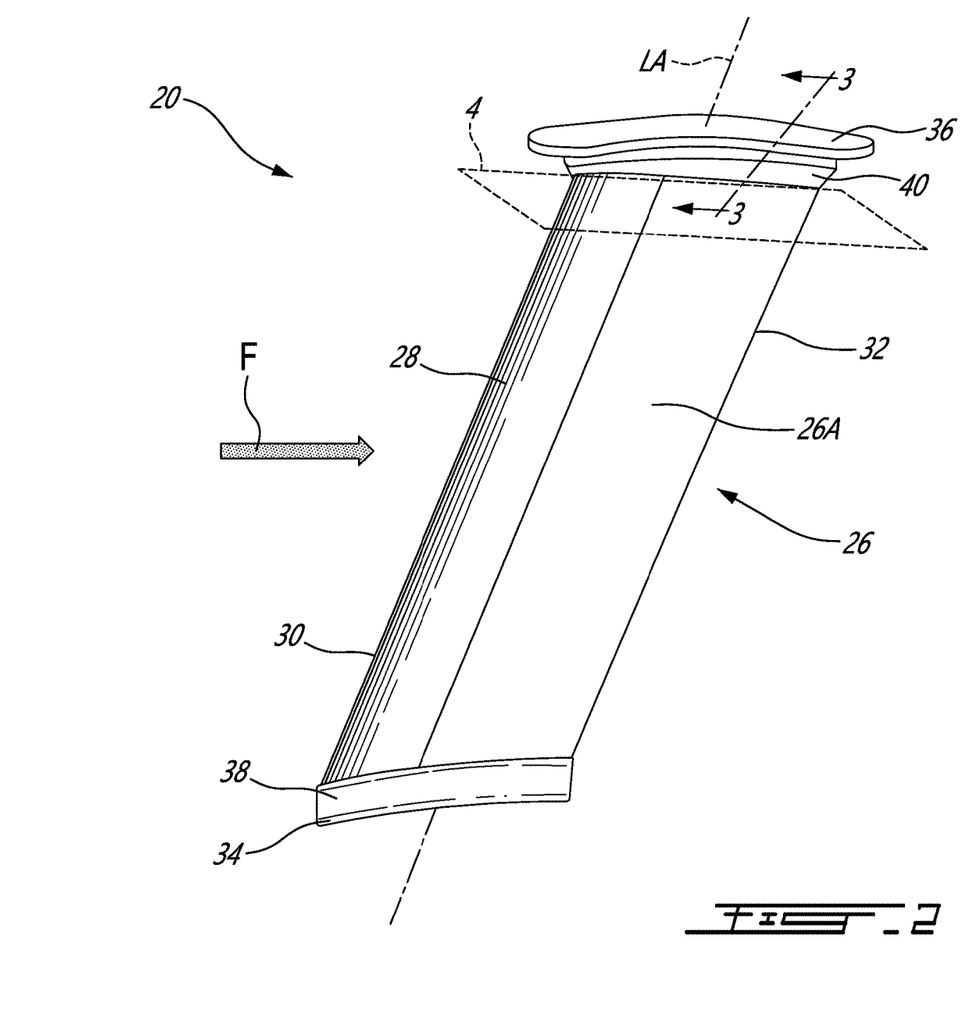
FIG. 2 is a perspective view of an exemplary composite guide vane of the engine of FIG. 1.

FIG. 2 is a perspective view of an exemplary vane 20 of engine 10. Vane 20 may include body 26 for interacting with a flow of fluid (e.g., air) in engine 10. Body 26 may be elongated so as to extend across core gas path 22 or bypass duct 24. Body 26 may have longitudinal axis LA extending lengthwise along body 26. Longitudinal axis LA may be perpendicular or non-perpendicular (e.g., oblique) to central axis CA. Longitudinal axis LA may be linear or curved. Longitudinal axis LA may extend through each transverse section of body 26 and may intersect central axis CA. Body 26 may have an airfoil-shaped cross-sectional profile taken transversely to longitudinal axis LA such as in reference plane 4 for example. Plane 4 may be orthogonal to longitudinal axis LA at an intersection of plane 4 with longitudinal axis LA.

Body 26 may be made from one or more fibrous (i.e., fiber-reinforced) composite materials. In some embodiments, vane 20 may include optional metallic sheath 28 covering (e.g., a forward) part of body 26. For example, metallic sheath 28 may define leading edge 30 of vane 20. Metallic sheath 28 may provide resistance against erosion, abrasion and impact from foreign objects that may enter engine 10. In some embodiments, metallic sheath 28 may be applied to body 26 by way of plating. Leading edge 30 and trailing edge 32 of vane 20 are illustrated in relation to a general direction F of the flow of fluid interacting with vane 20. Vane 20 may include elements of the vanes described in U.S. Pat. No. 11,352,891 (Title: METHOD FOR MANUFACTURING A COMPOSITE GUIDE VANE HAVING A METALLIC LEADING EDGE), which is incorporated herein by reference.

Vane 20 may have foot 34 and head 36 attached to respective opposite ends of vane 20. Foot 34 and head 36 may have similar or different configurations. In some embodiments, vane 20 may have either foot 34 or head 36 for attachment of vane 20 only from one end of vane 20. In relation to central axis CA of engine 10, foot 34 may be disposed at a radially inner end of body 26 of vane 20. Head 36 may be disposed at a radially outer end of body 26 of vane 20. Foot 34 may facilitate the attachment of vane 20 to a radially inner support structure (e.g., inner ring, shroud, engine casing, low pressure compressor housing) and head 36 may facilitated the attachment of vane 20 to a radially outer support structure (e.g., outer ring, shroud, engine casing). Vane 20 may also include radially inner platform 38 and radially outer platform 40 for interacting with the flow of fluid. Platforms 38, 40 may define flow-interacting surfaces between vanes 20 that are adjacent in the angular/circumferential direction about central axis CA. Foot 34 and head 36 intersecting body 26 may define a generally T-shape, L-shape or any shape suitable to facilitate installation and attachment of vane 20 within engine 10.

FIGS. 3A-3E each are schematic longitudinal cross-section views of exemplary embodiments of vane 20 taken along line 3-3 in FIG. 2. Like elements are identified using like reference numerals that have been successively incremented by 100 in each of FIGS. 3A-3E.

Figure 3A:
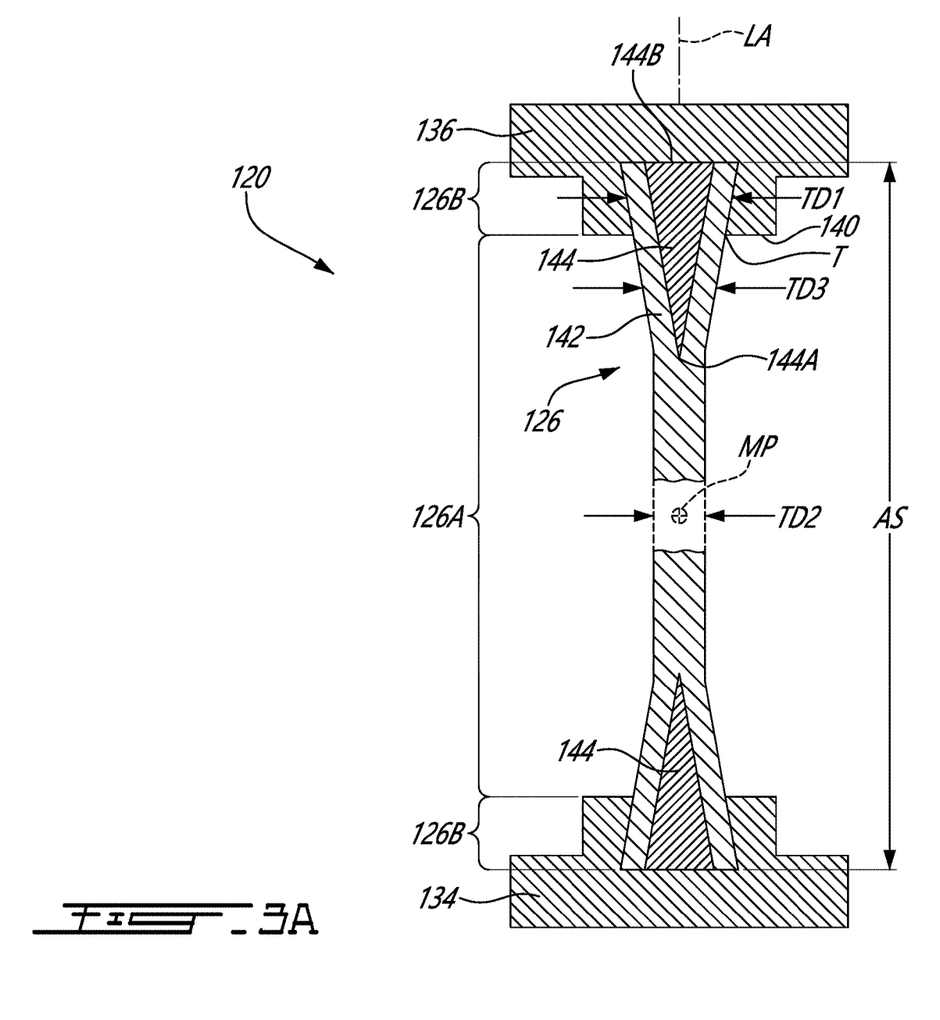
FIG. 3A is a schematic longitudinal cross-section view of an exemplary embodiment of the composite guide vane of FIG. 2 taken along line 3-3 in FIG. 2.

FIG. 3A illustrates a longitudinal cross-section of vane 120 which may include body 126 having longitudinal axis LA. Vane 120 is shown as having a non-specific length along longitudinal axis LA. Body 126 may include (e.g., composite) laminate 142 and (e.g., composite) insert 144 disposed inside (e.g., sandwiched between layers of) laminate 142. Laminate 142 may be made of an assembly of layers of a fibrous composite material such as fiber-reinforced composite sheets (e.g., fiber-reinforced unidirectional tape and/or fabric) joined together. Laminate 142 may define mid portion 126A of body 126 for interacting with the fluid, and end portion(s) 126B of body 126 disposed axially of mid portion 126A. In some embodiments, mid portion 126A may be disposed axially between two end portions 126B.

Vane 120 may include one or more inserts 144 made of another fibrous composite material. Insert 144 may extend axially (e.g., along longitudinal axis A) from a first axial location in end portion 126B of body 126 to a second axial location in mid portion 126A of body 126. For example, insert 144 may extend axially from end portion 126B of body 126 into mid portion 126A of body 126 and terminate in mid portion 126A of body 126. In some embodiments, insert 144 may have a generally tapered shape toward the opposite axial end of vane 120. For example, insert 144 may be wedge-shaped and may include base 144B disposed in end portion 126B, and apex 144A axially opposite of base 144B and disposed in mid portion 126A of body 126. Vane 120 may also include head 136 enveloping end portion 126B of body 126. In some embodiments, head 136 may be overmolded onto end portion 126B of body 126.

The present description mainly refers to an upper portion of vane 120 including head 36 for conciseness but it is understood that the present description may also or instead apply to a lower portion of vane 120 including foot 134 enveloping (e.g., being overmolded onto) end portion 126B of body 126. In some embodiments, the lower portion of vane 120 may optionally have a similar or substantially identical construction as the upper portion of vane 120 described herein. Alternatively, in some embodiments, the upper portion of vane 120 and the lower portion of vane 120 may have different constructions.

Insert 144 may extend only partially along axial span AS of body 126. In other words, insert 144 may not extend along the entire axial span AS of body 126. For example, insert 144 may terminate in mid portion 126A of body 126. For example, an axial span of insert 144 (i.e., the axial distance between base 144B and apex 144A) may be less then half of axial span AS of body 126. For example, insert 144 may not extend past axial midpoint MP of mid portion 126A of body 126.

Insert 144 may be used to reinforce (e.g., bulk-up, thicken) a region of body 126 that is enveloped by head 136 and/or that is adjacent to head 136. In some embodiments, a thicker region of body 126 interfacing with head 136 may serve to enhance the structural performance and optionally permit the use of a relatively sharp transition T between body 126 and outer platform 140 of head 136 instead of a rounded transition (e.g., fillet). It may be desirable to have such relatively sharp transition T for structural reasons and/or to facilitate manufacturing. Thickening of the applicable region(s) of body 126 may serve to reduce stresses in body 126 when vane 120 is subjected to bending loads for example.

The use of tapered insert 144 may permit the increase in thickness of body 126 to be substantially gradual along longitudinal axis LA. In other words, body 126 may also be tapered so that an axially transverse dimension (i.e., transverse to longitudinal axis LA) of body 126 may diminish gradually from end portion 126B toward axial midpoint MP of mid portion 126A of body 126. The shape and configuration of insert 144 (and consequently of body 126) may also provide mechanical interlocking between body 126 and head 136 so as to enhance the retention of body 126 within head 136. For example, having an end portion 126B of body 126 shaped to provide a larger transverse dimension radially outwardly of a smaller transverse dimension may provide anchoring of end portion 126B within head 136.

In various embodiments, body 126 may have a transverse dimension (e.g., width) that is non-uniform along longitudinal axis LA at least partially due to the presence of insert 144 inside of laminate 142. For example, body 126 may have first transverse dimension TD1 within end portion 126B of body 126, second transverse dimension TD2 at axial midpoint MP of mid portion 126A of body 126, and third transverse dimension TD3 at an axial location between axial midpoint MP of mid portion 126A and end portion 126B of body 126. Third transverse dimension TD3 may be axially closer to end portion 126B than to axial mid point MP of mid portion 126A. Third transverse dimension TD3 may be greater than second transverse dimension TD2. First transverse dimension TD1 may be greater than both second transverse dimension TD2 and third transverse dimension TD3. First transverse dimension TD1 and third transverse dimension TD3 may be taken at respective axial locations that axially overlap insert 144. Second transverse dimension TD2 may be taken at an axial location that does not axially overlap insert 144.

Figure 4:
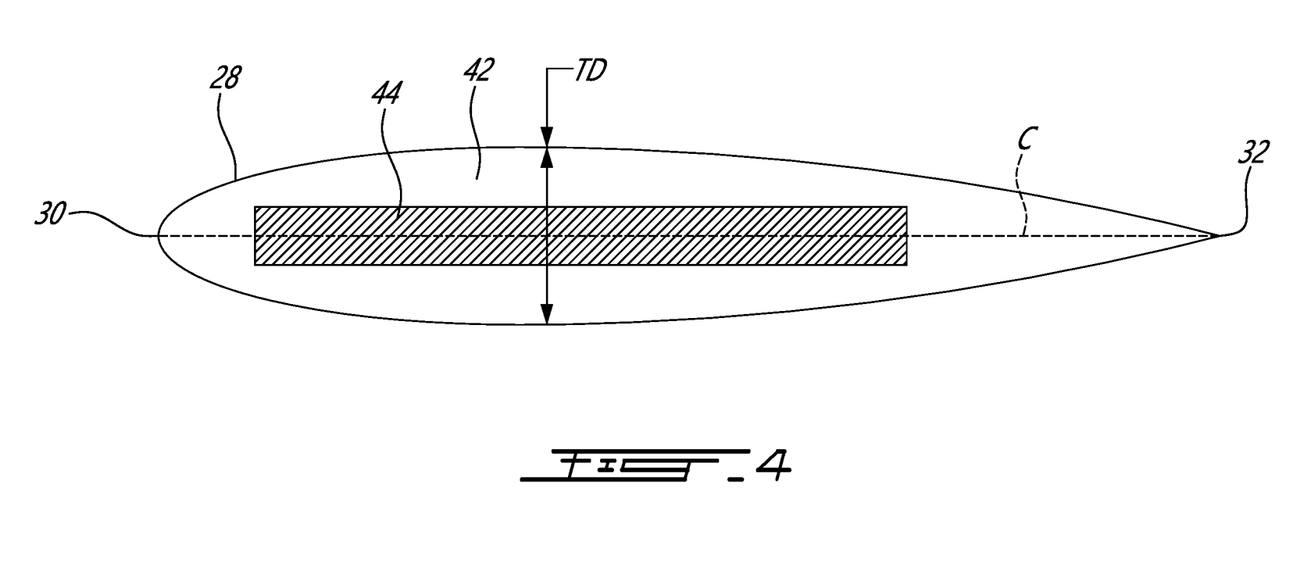
FIG. 4 is an exemplary schematic transverse cross-section of the composite guide vane of FIG. 2 intersecting plane 4 in FIG. 2.

In embodiments where body 126 has an airfoil-shaped cross-sectional profile as shown in FIG. 4 for example, transverse dimensions TD1, TD2 and TD3 may correspond maximum thicknesses of airfoil-shaped cross-sectional profiles of body 126 taken at different axial locations along longitudinal axis LA. In some embodiments, the airfoil-shaped cross-sectional profile of mid portion 126A of body 126 may have a maximum thickness that is axially non-uniform along longitudinal axis LA. For example, mid portion 126A of body 126 may have a first airfoil-shaped cross-sectional profile having a first maximum thickness (e.g., third transverse dimension TD3) and being at a first axial distance from end portion 126B of body 126. Mid portion 126A may have a second airfoil-shaped cross-sectional profile having a second maximum thickness (e.g., second transverse dimension TD2) that is smaller than the first maximum thickness. The second airfoil-shaped cross-sectional profile may be at a second axial distance from end portion 126B of body 126 greater than the first axial distance.

FIGS. 3B-3E each show an upper portion of vane 20 including head 36 but it is understood that the descriptions and illustrations of the upper portion of vane 20 could alternatively or additionally apply to the lower portion of vane 20 including foot 34.

Figure 3B:
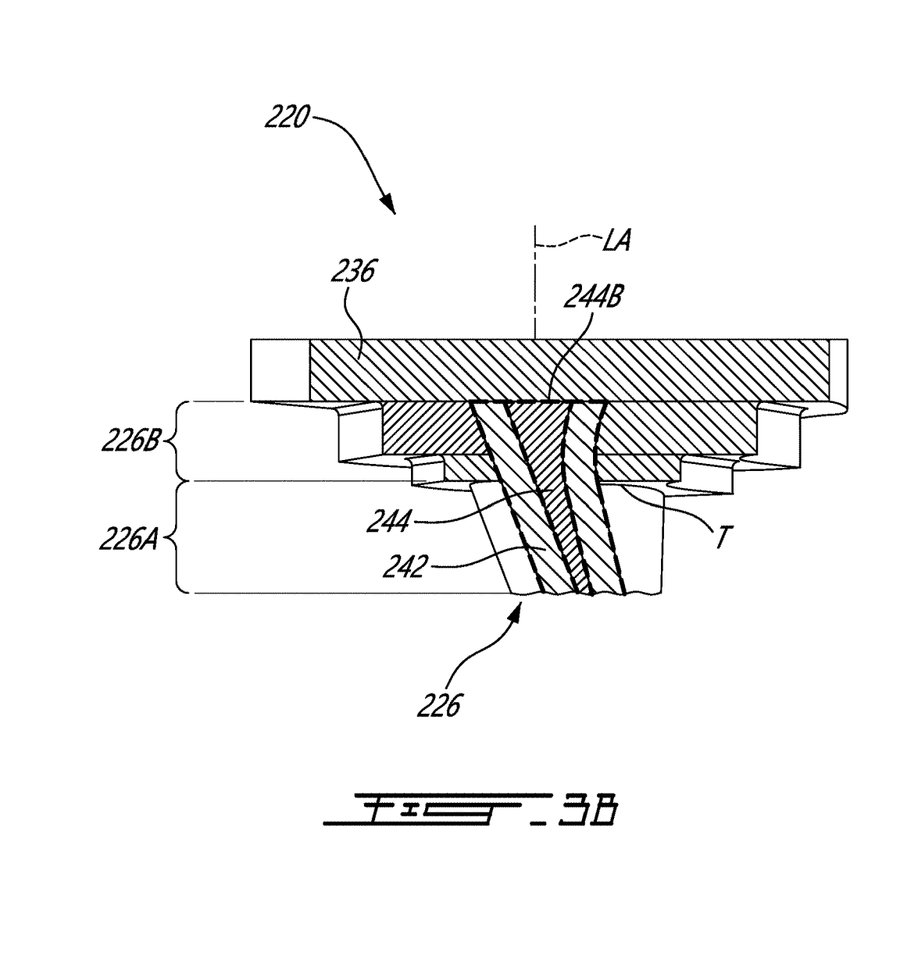
FIG. 3B is a schematic longitudinal cross-section view of an upper portion of another exemplary embodiment of the composite guide vane of FIG. 2 taken along line 3-3 in FIG. 2.

FIG. 3B illustrates a longitudinal cross-section of an upper portion of vane 220 which may include body 226 having longitudinal axis LA. Vane 220 may include elements of other vanes disclosed herein. Body 226 may include (e.g., composite) laminate 242 and (e.g., composite) insert 244 disposed inside (e.g., sandwiched between layers of) laminate 242. Laminate 242 may define mid portion 226A of body 226 for interacting with the fluid, and end portion 226B of body 226 disposed axially of mid portion 226A. In some embodiments, insert 244 may have one or more planar sides and/or one or more non-planar (curved) sides. The shape and size of insert 244 may be selected based on aerodynamic and/or structural considerations.

Interfaces between components of vane 220 are illustrated in FIG. 3B using broken lines. The components of vane 220 may be joined together at the interfaces using any suitable means. In some embodiments using compatible materials, the components of vane 220 may be fused together where the components are combined/united into a whole by melting the elements together at the interfaces shown in broken lines. The fused interfaces illustrated in FIG. 3B may also apply to other vane constructions disclosed herein. For example, the elements of vane 220 may be made from materials that are compatible to permit fusing at direct contact interfaces between the components with the application of heat. For example, in some embodiments, insert 244 and laminate 242 may include compatible (e.g., matrix) materials that permit the fusing of insert 244 together with laminate 242 during the consolidation of body 226 for example. Similarly, head 236 may include a (e.g., matrix) material that is compatible with a (e.g., matrix) material of insert 244 and/or with a (e.g., matrix) material of laminate 242 so that head 236 may be fused with base 244B of insert 244 and/or with outer surface(s) of laminate 242 during overmolding of head 236 onto end portion 226B for example.

In some embodiments, compatible materials that permit fusing between components may be thermoplastics that become pliable or moldable at a certain elevated temperature and solidify upon cooling. However, in some embodiments, one or more components of vane 220 may be made from a thermosetting polymer that is obtained by irreversible hardening (curing).

Figure 3C:
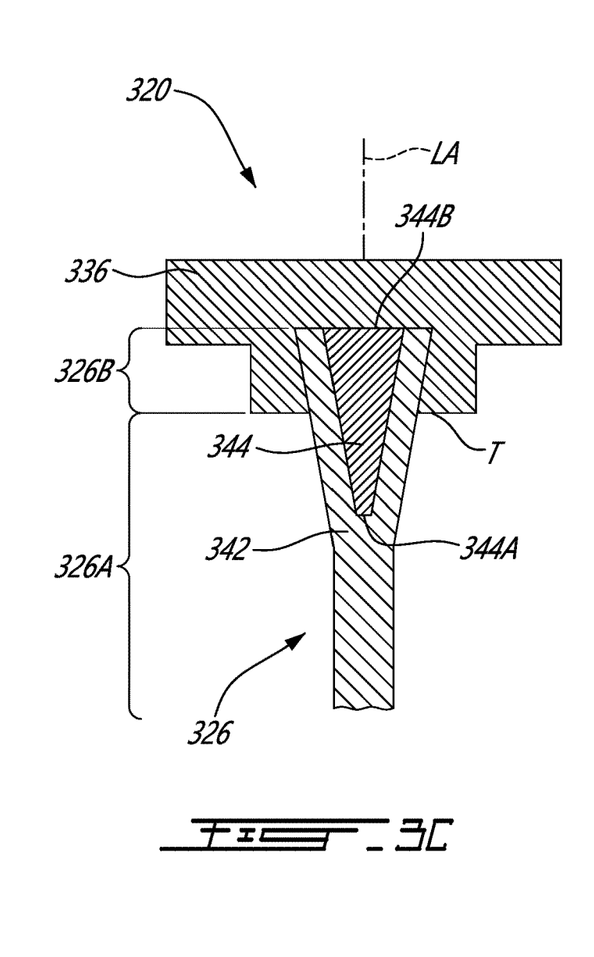
FIG. 3C is a schematic longitudinal cross-section view of an upper portion of another exemplary embodiment of the composite guide vane of FIG. 2 taken along line 3-3 in FIG. 2.

FIG. 3C illustrates a longitudinal cross-section of an upper portion of vane 320 which may include body 326 having longitudinal axis LA. Vane 320 may include elements of other vanes disclosed herein. Body 326 may include (e.g., composite) laminate 342 and (e.g., composite) insert 344 disposed inside (e.g., sandwiched between layers of) laminate 342. Laminate 342 may define mid portion 326A of body 326 for interacting with the fluid, and end portion 326B of body 326 disposed axially of mid portion 326A and enveloped by head 336. In some embodiments, insert 344 may be a truncated wedge having base 344B and a relatively blunt apex 344A (e.g., rounded or flat surface) instead of the relatively sharp apex 144A of vane 120 shown in FIG. 3A.

Figure 3D:
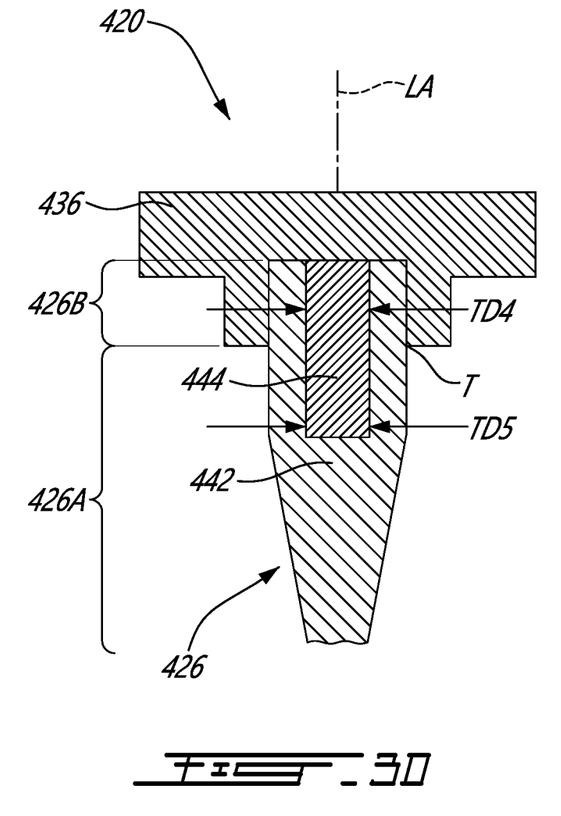
FIG. 3D is a schematic longitudinal cross-section view of an upper portion of another exemplary embodiment of the composite guide vane of FIG. 2 taken along line 3-3 in FIG. 2.

FIG. 3D illustrates a longitudinal cross-section of an upper portion of vane 420 which may include body 426 having longitudinal axis LA. Vane 420 may include elements of other vanes disclosed herein. Body 426 may include (e.g., composite) laminate 442 and (e.g., composite) insert 444 disposed inside (e.g., sandwiched between layers of) laminate 442. Laminate 442 may define mid portion 426A of body 426 for interacting with the fluid, and end portion 426B of body 426 disposed axially of mid portion 426A and enveloped by head 436. In some embodiments, insert 444 may have a substantially uniform transverse dimension along longitudinal axis LA. For example, insert 444 may have fourth transverse dimension TD4 in end portion 426B of body 426 and fifth transverse dimension TD5 in mid portion 426A of body 426. Fourth transverse dimension TD4 may be substantially the same as (equal to) fifth axially transverse dimension TD5.

Figure 3E:
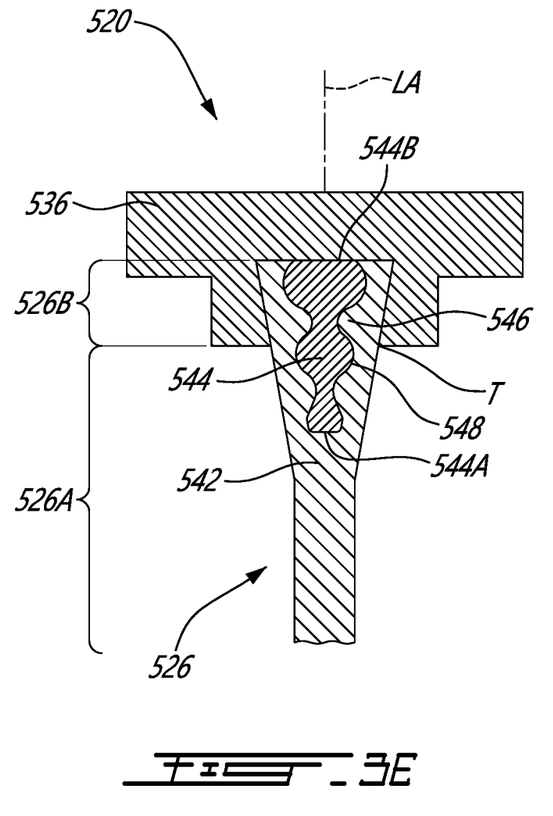
FIG. 3E is a schematic longitudinal cross-section view of an upper portion of another exemplary embodiment of the composite guide vane of FIG. 2 taken along line 3-3 in FIG. 2.

FIG. 3E illustrates a longitudinal cross-section of an upper portion of vane 520 which may include body 526 having longitudinal axis LA. Vane 520 may include elements of other vanes disclosed herein. Body 526 may include (e.g., composite) laminate 542 and (e.g., composite) insert 544 disposed inside (e.g., sandwiched between layers of) laminate 542. Laminate 542 may define mid portion 526A of body 526 for interacting with the fluid, and end portion 526B of body 526 disposed axially of mid portion 526A and enveloped by head 536. In some embodiments, insert 544 may have one or more recesses 546, one or more protrusions 548 and/or other surface features to promote anchoring between laminate 542 and insert 544. Recess(es) 546 and/or protrusion(s) 548 may be disposed axially between base 544B and apex 544A of insert 544. Fibrous composite material of laminate 542 may be received into recess(es) 546. Protrusion(s) 548 may extend at least partially transversely (to longitudinal axis LA) into the fibrous composite material of laminate 542.

FIG. 4 is an exemplary schematic transverse cross-section of vane 20 of FIG. 2 intersecting plane 4 in FIG. 2. Plane 4 is disposed in mid portion 26A (shown in FIG. 2) of body 26 at a location intersecting insert 44 integrated into (e.g., composite) laminate 42. In some embodiments, vane 20 may have an airfoil-shaped cross-sectional profile. In various embodiments, the airfoil-shaped cross-sectional profile may be symmetric or non-symmetric. The airfoil-shaped cross-sectional profile may have chord C extending from leading edge 30 to trailing edge 32, and having a chord length. Transverse dimension TD of body 26 at a location intersecting plane 4 may correspond to a maximum thickness of airfoil-shaped cross-sectional profile measured perpendicularly to chord C.

Figure 5:
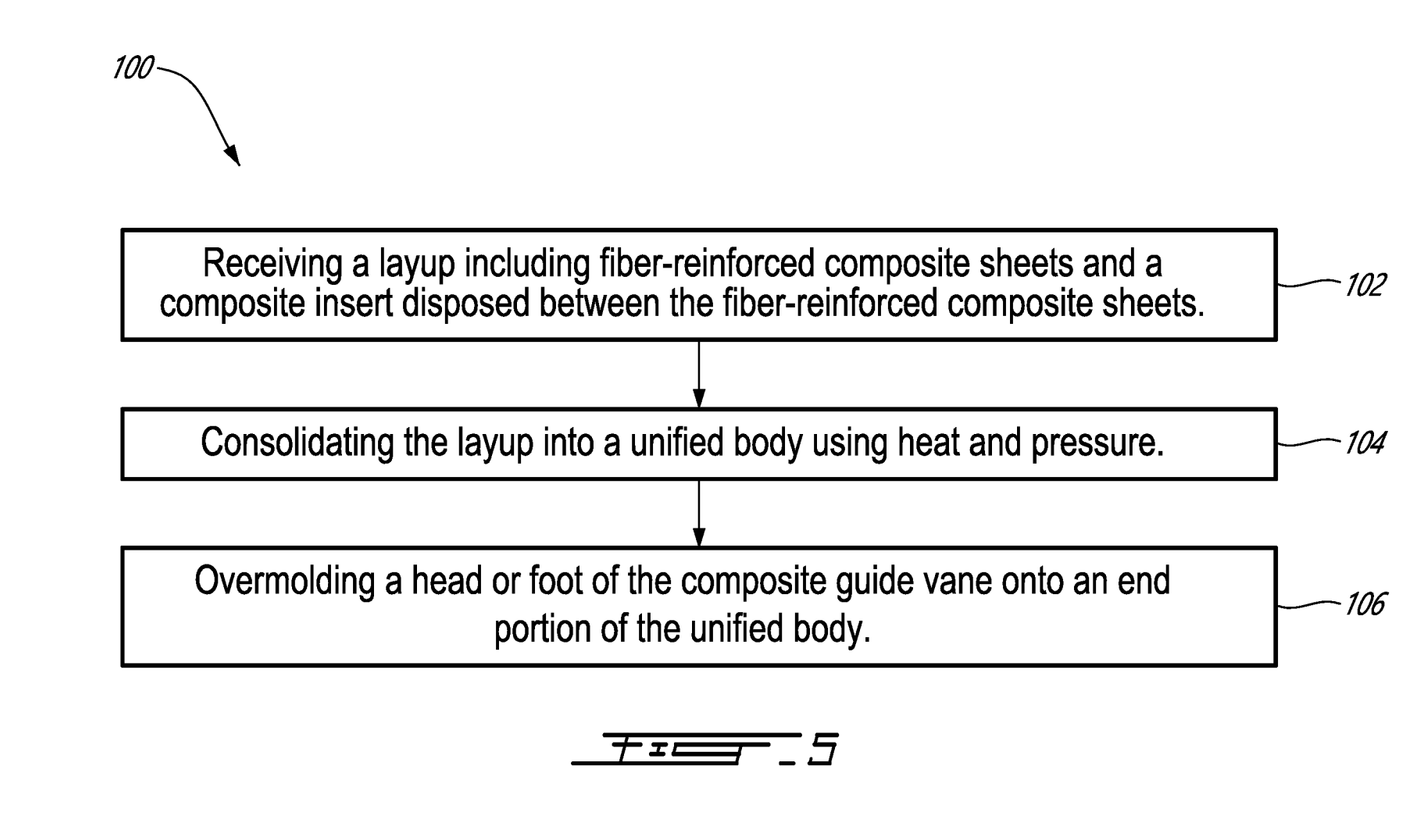
FIG. 5 a flowchart of an exemplary method of manufacturing a composite guide vane.

FIG. 5 a flow diagram of an exemplary method 100 of manufacturing any one of vane(s) 20, 120, 220, 320, 420, 520 or other composite guide vane(s). Method 100 may include other actions disclosed herein and/or may include elements of any of vane(s) 20, 120, 220, 320, 420, 520. Aspects of method 100 are described below in reference to FIGS. 6-10 and in reference to vane 120 being used as an example. In various embodiments, method 100 may include:
 receiving layup 150 (shown in FIG. 8) including fiber-reinforced composite sheets 152 (shown in FIG. 8) and insert 144 disposed between fiber-reinforced composite sheets 152 (block 102);
 consolidating layup 150 into a unified body 126 using heat and pressure (block 104); and
 overmolding head 136 or foot 134 of vane 120 onto end portion 126B of body 126 (block 106).

Figure 6:
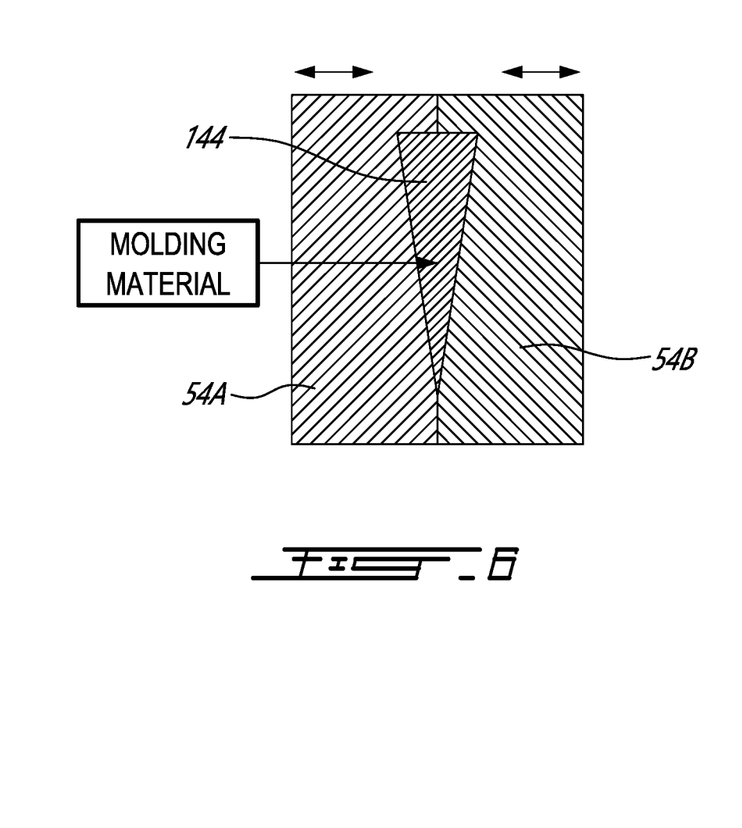
FIG. 6 is a schematic cross-sectional representation of an exemplary composite insert of the composite guide vane of FIG. 2 together with mold portions for forming the composite insert.

FIG. 6 is a schematic cross-sectional representation of insert 144 of vane 120 together with mold portions 54A, 54B for forming insert 144 using injection molding using molding material. Mold portions 54A, 54B are shown as being brought together to form insert 144 while molding material in a molten state is being injected inside the cavity defined by mold portions 54A, 54B and subsequently cooled inside of the cavity. Mold portions 54A, 54B may also be movable away from each other to release insert 144 from mold portions 54A, 54B after forming.

In some embodiments, insert 144 may be made by injection molding using short fibers embedded in a thermoplastic or thermosetting matrix material. Such short fibers may have lengths of a few millimeters or less. For example, such short fibers may have lengths of about 5 mm or less. In some embodiments, such short fibers may have lengths of about 2 mm or less. In some embodiments, such short fibers may have lengths of about 1 mm or less. In some embodiments, such short fibers may have lengths of between 1 mm and 5 mm. In some embodiments, insert 144 may be made by injection molding using a thermosetting or thermoplastic material (e.g., neat resin) that is devoid of any fiber reinforcement.

Alternatively, insert 144 may be formed using another suitable process. The fibers of insert 144 may be continuous or discontinuous. The orientation of the fibers of insert 144 may be controlled or random in various embodiments. Insert 144 may include long, medium-length and/or short fibers. For example, insert 144 may be formed from a layup of fiber-reinforced composite sheets (i.e., laminate stacking) combined with preforming or consolidation and/or compression molding. For example, insert 144 may be formed using additive polymer manufacturing. For example, insert 144 may machined from a block of fiber-reinforced composite material.

Figure 7:
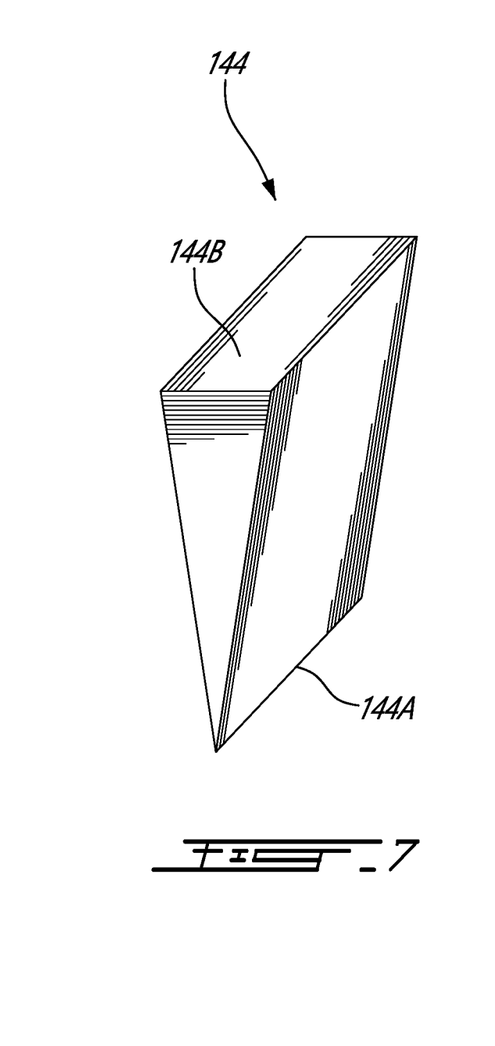
FIG. 7 is a perspective view of the composite insert of FIG. 6.

FIG. 7 is a perspective view of insert 144 released from mold portions 54A, 54B of FIG. 6. In some embodiments, insert 144 may wedge-shaped (e.g., V-shaped, triangular-shaped wedge) as shown in FIG. 7.

Figure 8:
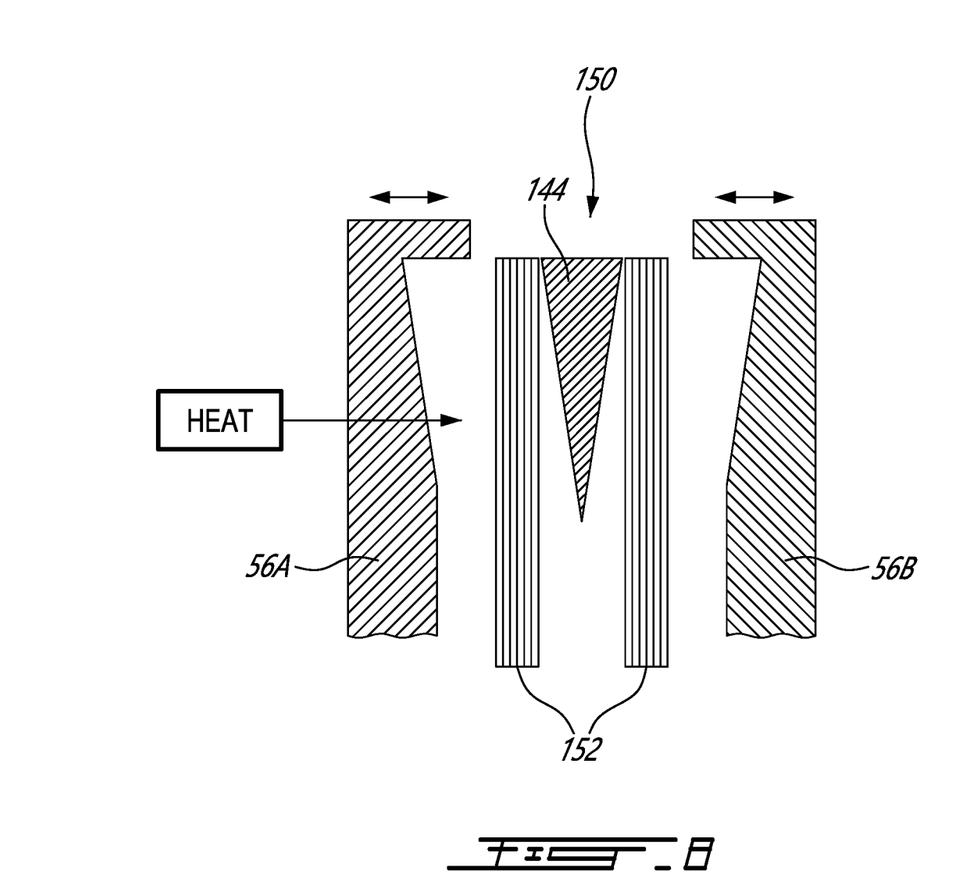
FIG. 8 is a partial schematic cross-sectional representation of an exemplary layup together with mold portions for consolidating an exemplary upper portion of the body of the composite guide vane.

FIG. 8 is a partial schematic cross-sectional representation of an exemplary layup 150 together with mold portions 56A, 56B for consolidating an exemplary upper portion of body 126 of vane 120 from layup 150 after forming insert 144. Layup 150 may include fiber-reinforced composite sheets 152 (i.e., layers of fibrous composite material) and insert 144 disposed between fiber-reinforced composite sheets 152. In some embodiments, layup 150 may include insert 144 inserted (i.e., sandwiched) between two fiber-reinforced composite sheets 152. In some embodiments, layup 150 may include insert 144 integrated in a stack of multiple (e.g., more than two) fiber-reinforced composite sheets 152. Layup 150 may be consolidated (e.g., at least partially densified) into a single unified body 126 using heat and pressure using a press defined by mold portions 56A, 56B for stamping/compression molding layup 150 to its desired shape.

Sheets 152 may be a suitable continuous fiber reinforced thermoplastic (CFRT) composite. For example, each sheet 152 may be a layer of continuous, substantially parallel and non-interlaced fibers pre-impregnated with a thermoplastic or thermosetting resin. In some embodiments, each sheet 152 may be of a type known as "unidirectional tape" or "UD tape" where a single-layered, fiber-reinforced (e.g., thermoplastic) composite sheet in which long continuous fibers are unrolled, laid and impregnated with a (e.g., thermoplastic) resin. The UD tape may be pre-impregnated with resin. In some embodiments, each sheet 152 may be a woven tissue/fabric cloth that is pre-impregnated with resin. As non-limiting examples, sheets 152 may each have a thickness of about 0.005 inch (0.13 mm) or about 0.010 inch (0.25 mm).

Sheets 152 may be cut automatically on a standard ply cutting table or formed using automated tape laying (ATL) equipment. Sheets 152 may be stacked manually or robotically in mold portions 56A, 56B. Sheets 152 may be pre-consolidated in a press or tack welded together before placing between mold portions 56A, 56B. Sheets 152 may be cut and stacked based on the desired final shape of body 126 after forming (e.g., stamping, compression molding) using mold portions 56A, 56B.

The orientation of respective sheets 152 in layup 150 may be selected to tailor the mechanical properties of body 126 in desired loading directions. In various embodiments, sheets 152 in layup 150 may have different orientations (stacking angles). In some situations, the use of sheets 152 with continuous unidirectional fibers and stacking angles may provide control over the final mechanical properties of body 126. In some embodiments, at least some sheets 152 and hence some of the continuous unidirectional fibers may extend continuously along substantially an entire axial span AS (shown in FIG. 3A) of body 126. For example, at least some of the long fibers from sheets 152 may extend continuously from one end portion 126B, through mid portion 126A and to the other opposite end portion 126B.

In some embodiments, the materials of sheets 152 (for forming laminate 142), of insert 144 and optionally of head 136 and/or foot 134 may be compatible with each other so that during heating, consolidation and overmolding, a fused joint may be formed between the components of vane 120. Insert 144, laminate 142, and optionally head 136 and/or foot 134 may include long and/or short fibers embedded in a suitable (e.g., polymeric) matrix material. The fibers may, for example, be made from glass and/or carbon. Matrix materials may include thermoplastic resins and/or thermosetting resins. In various embodiments, suitable matrix materials for insert 144, laminate 142, foot 34 and/or head 36 may include polyether ether ketone (PEEK), such as product numbers 450CA30 or 90HMF40 by VICTREX™, polyamide, epoxy, polyurethane, phenolic and amino resins, and bismaleimides (BMI) for example. In some embodiments, sheets 152 may include unidirectional carbon fiber reinforced thermoplastic tape. For example, sheets 152 may include polyaryletherketone (PAEK) impregnated UD tape. In some embodiments, insert 144, foot 34 and/or head 36 may be made from a relatively high performance thermoplastic material such as product number 90HMF40 which includes 40% carbon fiber reinforced polyetheretherketone (PEEK) and semi crystalline in the form of granules suitable for injection molding.

For example, in some embodiments, the layers of fibers (i.e., sheets 152) in layup 150 may include unidirectional tape of first fibers impregnated with a first matrix material. Insert 144 may includes a second matrix material. Consolidating layup 150 into body 126 using heat and pressure may include fusing the first matrix material of sheets 152 with the second matrix material of insert 144.

For example, in some embodiments, the fibers in sheets 152 may include continuous fibers extending continuously along an entire axial span AS of body 126. Sheets 152 may include continuous, substantially parallel and non-interlaced fibers impregnated with a thermoplastic resin. Insert 144 may include (e.g., randomly oriented) fibers that are shorter than the continuous fibers of sheets 152.

For example, in some embodiments, sheets 152 may include a first thermoplastic matrix material. Insert 144 may include a second thermoplastic matrix material. Consolidating layup 150 into body 126 may include fusing sheets 152 with the insert 144.

Figure 9:
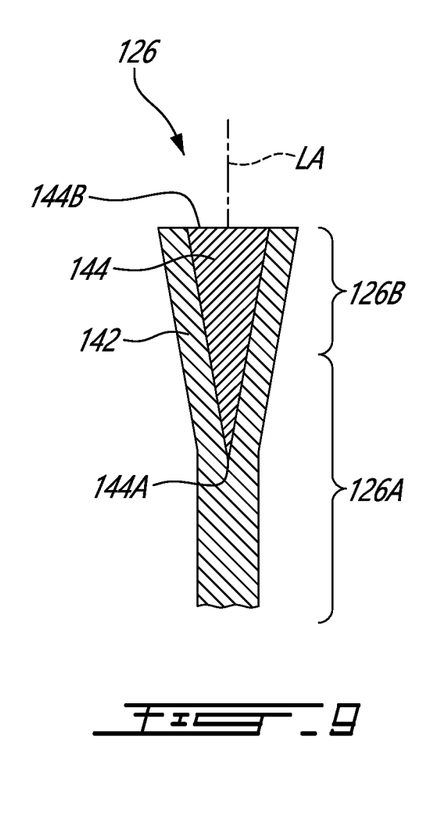
FIG. 9 is a longitudinal cross-section view of the upper portion of the body of the composite guide vane.

FIG. 9 is a longitudinal cross-section view of an upper portion of stamped body 126 of vane 120 released from mold portions 56A, 56B of FIG. 8. Body 126 may have longitudinal axis LA and may include mid portion 126A for interacting with the fluid and end portion 126B disposed axially of mid portion 126A. Insert 144 may extend axially from a first location in end portion 126B to a second location in mid portion 126A.

Figure 10:
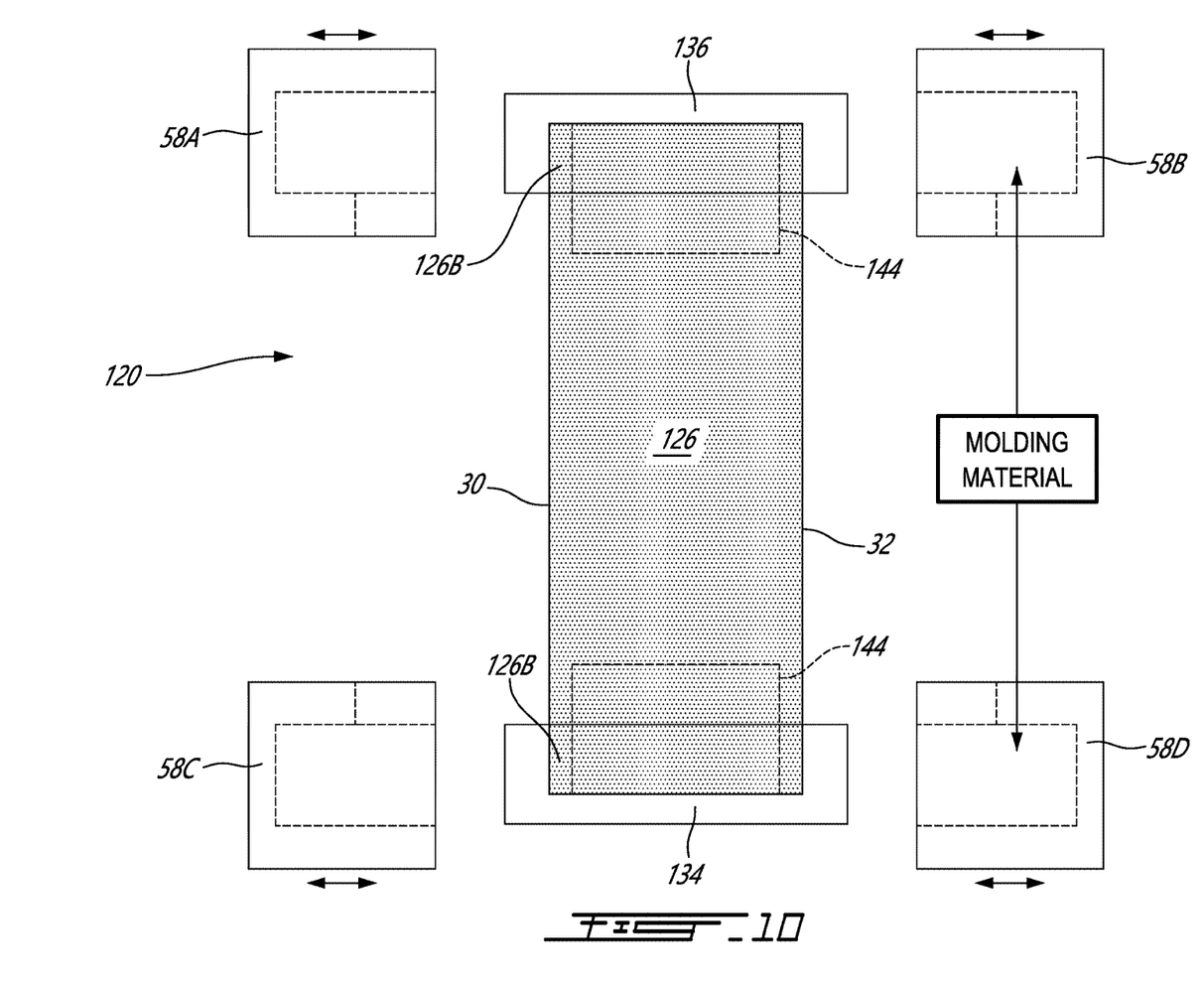
FIG. 10 is a schematic representation of an exemplary composite guide vane together with mold portions for overmolding a head and a foot on the body of the composite guide vane.

FIG. 10 is a schematic representation of a side view of vane 120 together mold portions 58A, 58B for injection overmolding head 136 and mold portions 58C, 58D for injection overmolding foot 134 on body 126. Head 136 and/or foot 134 may be overmolded onto body 126 after the forming of body 126. Inserts 144 are shown in broken lines. Head 136 and foot 134 are shown as being transparent for clarity and for illustrating the components enveloped by head 136 and foot 134 by way of overmolding.

Head 136 and foot 134 may be overmolded using suitable overmolding material. The overmolding material may include a thermoplastic or thermosetting resin containing relatively short (and optionally randomly oriented) reinforcement fibers as described above. The fibers in the overmolding material may be shorter than the fibers in laminate 142 (shown in FIG. 9). Alternatively, the overmolding material may include a thermoplastic or thermosetting resin that is devoid of reinforcement fibers. The thermoplastic or thermosetting resin selected for the overmolding material may be substantially identical or chemically compatible with one or more resins used in body 126. For example, in some embodiments, the overmolding material of head 136 and/or foot 134 may be fibrous composite material including a matrix material. Overmolding head 136 and/or foot 134 of vane 120 onto end portion(s) 126B of body 126 may include: fusing the matrix material of head 136 and/or foot 134 with the matrix material of laminate 142; and/or fusing the matrix material of head 136 and/or foot 134 with the matrix material of insert 144.

The embodiments described in this document provide non-limiting examples of possible implementations of the present technology. Upon review of the present disclosure, a person of ordinary skill in the art will recognize that changes may be made to the embodiments described herein without departing from the scope of the present technology.

What is claimed is:

1. A composite guide vane for a gas turbine engine, the composite guide vane comprising:
  a body having a longitudinal axis, the body including:
    a composite laminate made of an assembly of layers of a first fibrous composite material, the composite laminate defining a mid portion of the body for interacting with a fluid and an end portion of the body disposed axially of the mid portion of the body; and
    a composite insert disposed inside the composite laminate and made of a second fibrous composite material, the composite insert extending axially from the end portion of the body into the mid portion of the body and terminating in the mid portion of the body; and
  a head or foot overmolded onto the end portion of the body so that the head or foot is fused with the composite laminate,
  wherein:
    the composite laminate includes a first matrix material;
    the composite insert includes a second matrix material fused with the first matrix material of the composite laminate; and
    the head or foot is made of a third fibrous composite material including a third matrix material directly fused with the first matrix material of the composite laminate and with the second matrix material of the composite insert.

2. The composite guide vane as defined in claim 1, wherein the first matrix material and the second matrix material are thermoplastics.

3. The composite guide vane as defined in claim 1, wherein the composite laminate includes continuous fibers extending continuously along an entire axial span of the body.

4. The composite guide vane as defined in claim 3, wherein the composite insert includes fibers that are shorter than the continuous fibers of the composite laminate.

5. The composite guide vane as defined in claim 1, wherein an axial span of the composite insert is less than half of an axial span of the body.

6. The composite guide vane as defined in claim 1, wherein:
  the composite insert is wedge-shaped and includes a base and an apex axially opposite of the base;
  the base of the composite insert is disposed in the end portion of the body; and
  the apex of the composite insert is disposed in the mid portion of the body.

7. The composite guide vane as defined in claim 1, wherein the composite insert is a truncated wedge.

8. The composite guide vane as defined in claim 1, wherein:
  the composite insert has a first axially transverse dimension in the end portion of the body; and
  the composite insert has a second axially transverse dimension in the mid portion of the body, the first axially transverse dimension being greater than the second axially transverse dimension.

9. The composite guide vane as defined in claim 1, wherein:
  the composite insert has a first axially transverse dimension in the end portion; and
  the composite insert has a second axially transverse dimension in the mid portion, the first axially transverse dimension being substantially the same as the second axially transverse dimension.

10. The composite guide vane as defined in claim 1, wherein the composite insert includes: a recess in which the first fibrous composite material of the composite laminate is received; and/or a protrusion extending transversely into the first fibrous composite material of the composite laminate.

11. The composite guide vane as defined in claim 1, wherein the body includes:
  a first airfoil-shaped cross-sectional profile of the mid portion of the body having a first maximum thickness and being at a first axial distance from the end portion of the body; and
  a second airfoil-shaped cross-sectional profile of the mid portion of the body having a second maximum thickness that is smaller than the first maximum thickness, the second airfoil-shaped cross-sectional profile being at a second axial distance from the end portion of the body greater than the first axial distance.

12. The gas turbine engine as defined in claim 11, wherein the composite laminate, the insert and the head or foot each include a thermoplastic.

13. A gas turbine engine comprising:
  an air inlet for receiving air;
  a compressor for pressurizing the air;
  a combustor in which the air is received from the compressor, mixed with fuel and ignited for generating a stream of combustion gas;
  a turbine for extracting energy from the combustion gas; and
  a composite guide vane for interacting with the air, the composite guide vane including:
    a body having a longitudinal axis, the body including:
      a composite laminate made of an assembly of layers of a fibrous composite material, the composite laminate defining a mid portion of the body for interacting with a fluid and an end portion of the body disposed axially of the mid portion; and
      an insert sandwiched between two of the layers of the composite laminate and fused with the composite laminate, the insert extending axially from the end portion into the mid portion and terminating in the mid portion of the body; and
    a head or foot overmolded onto the end portion of the body, the head or foot being fused with the composite laminate and also directly fused with the insert.

14. The gas turbine engine as defined in claim 13, wherein:
  the gas turbine engine is a turbofan gas turbine engine including a core gas path and a bypass duct;
  the compressor, the combustor and the turbine are disposed serially along the core gas path; and
  the composite guide vane is disposed either in the core gas path upstream of the combustor or in the bypass duct.

15. A method of manufacturing a composite guide vane of a gas turbine engine, the method comprising:
  receiving a layup including fiber-reinforced composite sheets and a composite insert disposed between the fiber-reinforced composite sheets;

consolidating the layup into a unified body using heat and pressure, the body having a longitudinal axis and including a mid portion for interacting with a fluid and an end portion disposed axially of the mid portion, the composite insert extending axially from a first location in the end portion to a second location in the mid portion; and injection overmolding a head or foot of the composite guide vane onto the end portion of the body so that the head or foot is fused with the end portion of the body.

16. The method as defined in claim 15, wherein:

fiber-reinforced composite sheets include a first thermoplastic matrix material;

the composite insert includes a second thermoplastic matrix material; and consolidating the layup into the unified body includes fusing the fiber-reinforced composite sheets with the composite insert.

17. The method as defined in claim 15, wherein:

the composite sheets include continuous, substantially parallel and non-interlaced fibers impregnated with a thermoplastic resin; and the composite insert includes randomly oriented fibers that are shorter than the fibers of the composite sheets.

\* \* \* \* \*